(12) United States Patent
Eom

(10) Patent No.: US 10,184,389 B2
(45) Date of Patent: Jan. 22, 2019

(54) VEHICLE ENGINE

(71) Applicant: HYUNDAI MOTOR COMPANY, Seoul (KR)

(72) Inventor: Tae Kwang Eom, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 40 days.

(21) Appl. No.: 15/138,900

(22) Filed: Apr. 26, 2016

(65) Prior Publication Data

US 2017/0167361 A1  Jun. 15, 2017

(30) Foreign Application Priority Data

Dec. 15, 2015 (KR) ........................ 10-2015-0178813

(51) Int. Cl.
| | |
|---|---|
| F02B 27/00 | (2006.01) |
| F02B 17/00 | (2006.01) |
| F02F 3/24 | (2006.01) |
| F02B 77/04 | (2006.01) |
| F02M 27/08 | (2006.01) |
| F02M 27/04 | (2006.01) |
| F02F 3/00 | (2006.01) |

(52) U.S. Cl.
CPC .......... *F02B 27/001* (2013.01); *F02B 17/005* (2013.01); *F02B 77/04* (2013.01); *F02F 3/24* (2013.01); *F02M 27/04* (2013.01); *F02M 27/08* (2013.01); *F02F 3/00* (2013.01); *F02M 2027/047* (2013.01); *Y02T 10/146* (2013.01)

(58) Field of Classification Search
CPC .. F02M 27/04; F02M 27/08; F02M 2027/047; F02B 27/001; F02B 77/04; F02B 17/005; F02F 3/24
See application file for complete search history.

(56) References Cited

U.S. PATENT DOCUMENTS

| | | | | |
|---|---|---|---|---|
| 2,760,475 A | * | 8/1956 | Bodine, Jr. | ............. F02B 23/08 123/193.6 |
| 2,766,582 A | * | 10/1956 | Smith | ..................... F02B 51/04 123/184.39 |
| 3,834,364 A | * | 9/1974 | Bartholomew | ........ F02M 27/08 123/184.39 |
| 4,428,350 A | * | 1/1984 | Cavani | .................... F02B 51/04 123/143 B |

(Continued)

FOREIGN PATENT DOCUMENTS

| | | |
|---|---|---|
| JP | S60-06824 U | 1/1985 |
| JP | 4823027 B2 | 11/2011 |

(Continued)

*Primary Examiner* — Mahmoud Gimie
*Assistant Examiner* — Josh Campbell
(74) *Attorney, Agent, or Firm* — McDermott Will & Emery LLP

(57) ABSTRACT

A vehicle engine includes a cylinder block, a cylinder head installed at an upper portion of the cylinder block and forming a combustion chamber therein, a piston installed at the cylinder block and reciprocating in the cylinder block so that the volume of the combustion chamber is compressed or expanded, an injector installed at the cylinder head for injecting fuel into the combustion chamber, a spark plug installed at the cylinder head for igniting the fuel injected from the injector, and a voltage generating member installed inside the piston so that a voltage is generated by a pressure generated during a compression stroke of the piston.

3 Claims, 3 Drawing Sheets

(56) References Cited

U.S. PATENT DOCUMENTS

| | | | | |
|---|---|---|---|---|
| 4,955,338 A | * | 9/1990 | Diwakar | F02F 3/28 123/276 |
| 5,423,306 A | * | 6/1995 | Trigger | F02P 3/01 123/637 |
| 6,450,154 B1 | * | 9/2002 | Choi | F02B 1/12 123/48 A |
| 2010/0066181 A1 | * | 3/2010 | Keller | H02K 53/00 310/20 |
| 2010/0289263 A1 | * | 11/2010 | Hyde | F02B 63/04 290/41 |
| 2013/0104862 A1 | * | 5/2013 | Gingrich | F02P 23/045 123/620 |
| 2014/0026849 A1 | * | 1/2014 | Ikeda | F02M 27/042 123/299 |
| 2014/0202864 A1 | * | 7/2014 | Hasegawa | F02M 27/04 204/557 |
| 2014/0299085 A1 | * | 10/2014 | Ikeda | F02B 9/00 123/143 B |
| 2015/0037738 A1 | * | 2/2015 | McAlister | F02M 57/06 431/6 |
| 2017/0114756 A1 | * | 4/2017 | McAlister | F02B 43/10 |

FOREIGN PATENT DOCUMENTS

| | | | | |
|---|---|---|---|---|
| JP | 2015017587 A | * | 1/2015 | ............ F02F 1/18 |
| JP | 2015-021422 A | | 2/2015 | |
| KR | 10-2010-0043617 A | | 4/2010 | |
| KR | 10-2013-0062804 A | | 6/2013 | |
| KR | 10-1308545 B1 | | 9/2013 | |
| KR | 10-2015-0092315 A | | 8/2015 | |

* cited by examiner

VEHICLE ENGINE

CROSS-REFERENCE TO RELATED APPLICATION

This application claims the benefit of priority to Korean Patent Application No. 10-2015-0178813, filed with the Korean Intellectual Property Office on Dec. 15, 2015, the entire contents of which are incorporated herein by reference.

TECHNICAL FIELD

The present disclosure relates to a vehicle engine, and more particularly, to an engine of a vehicle to which a gasoline direct injection (GDI) method is applied which may prevent fuel particles from being adsorbed to a combustion chamber and a piston therein and may further prevent abnormal combustion.

BACKGROUND

Generally, an internal combustion engine, particularly an engine of 4 stroke cycles, generates driving torque through intake, compression, expansion, and exhaust strokes in each combustion chamber. Such an engine changes heat energy generated from fuel combustion into kinetic energy.

In this case, the combustion chamber of the engine is formed by combining a cylinder head with a cylinder block, and a piston is installed in the cylinder block to reciprocate so that the volume of the combustion chamber may be varied according to a reciprocating motion of the piston associated with the compression and expansion strokes.

The cylinder head is provided with an intake port for introducing air into the combustion chamber and an exhaust port for emitting an exhaust gas combusted in the combustion chamber, an intake valve for opening and closing the intake port and an exhaust valve for opening and closing the exhaust port.

The cylinder head is provided with an injector which injects fuel into the combustion chamber and is installed to be adjacent to the intake port, and a spark plug for igniting the fuel injected by the injector.

Recently, a gasoline direct injection (GDI) engine which directly injects gasoline fuel into the combustion chamber has been researched and used, and the gasoline direct injection engine operates with a lean air/fuel ratio, thereby reducing fuel consumption, improving intake efficiency and increasing power.

The gasoline direct injection engine may produce a higher compression ratio than a typical gasoline engine, and may effectively maximize power generated.

However, in the gasoline direct injection engine, fuel particles of gasoline injected into the combustion chamber are adsorbed to an inner wall of the combustion chamber, the piston, and the spark plug and are not completely combusted, resulting in abnormal combustion.

Moreover, due to the adsorption of the fuel particles, the combustion chamber, the piston, and the spark plug may be damaged, a carbon stack may occur, and a starting delay and thus additional fuel injection may occur, such that a durability of the engine and fuel efficiency may deteriorate.

The above information disclosed in this Background section is only to enhance the understanding of the background of the disclosure and therefore it may contain information that does not form the prior art that is already known in this country to a person of ordinary skill in the art.

SUMMARY

The present disclosure has been made in an effort to provide a vehicle engine that may prevent fuel particles from being adsorbed to the inside of a combustion chamber and a piston thereof, and may prevent abnormal combustion, and thus may improve durability of the engine and fuel efficiency, by generating an electric field in the combustion chamber so that a fuel is completely combusted in a stratified mode in a vehicle to which a gasoline direct injection (GDI) method is applied.

An exemplary embodiment of the present disclosure provides a vehicle engine including: a cylinder block; a cylinder head installed at an upper portion of the cylinder block and forming a combustion chamber therein; a piston installed at the cylinder block to reciprocate in the cylinder block so that the volume of the combustion chamber is compressed or expanded; an injector installed at the cylinder head and injecting fuel into the combustion chamber; a spark plug installed at the cylinder head and igniting the fuel injected from the injector; and a voltage generating member installed inside the piston so that a voltage is generated by a pressure generated during a compression stroke of the piston.

When the voltage is generated, the voltage generating member may form an electric field by a potential difference in the combustion chamber so that repulsive force is generated among charged fuel particles injected from the injector.

The voltage generating member may be made of a piezoelectric material.

The voltage generating member may transmit a positive voltage to an upper inner surface of the combustion chamber provided at the cylinder head, and may transmit a negative voltage to an inner wall of the combustion chamber and a top surface of the piston.

The voltage generating member may be electrically connected to an external power supply provided at the outside of the cylinder block.

The external power supply, when the vehicle is off and/or an ignition is on, may apply a predetermined voltage to the voltage generating member to excite and vibrate an ultrasonic wave generated from the voltage generating member.

The ultrasonic wave generated from the voltage member may remove a carbon stack formed on the combustion chamber, the piston and the spark plug.

A bowl may be provided at the top surface of the piston so the fuel injected from the injector swirl-flows.

According to the vehicle engine of the embodiment of the present disclosure, it is possible to prevent the fuel particles from being adsorbed to the inside of the combustion chamber and the piston, to prevent the abnormal combustion, and to improve combustion efficiency, by generating the electric field in the combustion chamber so that particles charged from an injector are completely combusted in the stratified mode during the compression stroke in the vehicle to which the gasoline direct injection (GDI) method is applied.

Moreover, according to the vehicle engine of the embodiment of the present disclosure, it is possible to improve durability of the engine and fuel efficiency by preventing the fuel particles from being adsorbed to undesirable places, by minimizing damage of the combustion chamber, the piston, and the spark plug, by minimizing occurrence of the carbon stack, and by preventing the starting delay and the additional fuel injection.

Furthermore, according to the vehicle engine of the embodiment of the present disclosure, it is possible to remove the carbon stacks formed on the combustion chamber, the piston, and the spark plug by applying a predetermined voltage to the voltage generating member so that the ultrasonic wave is generated while the starting is off, or the ignition is on.

DETAILED DESCRIPTION

Figure 1:
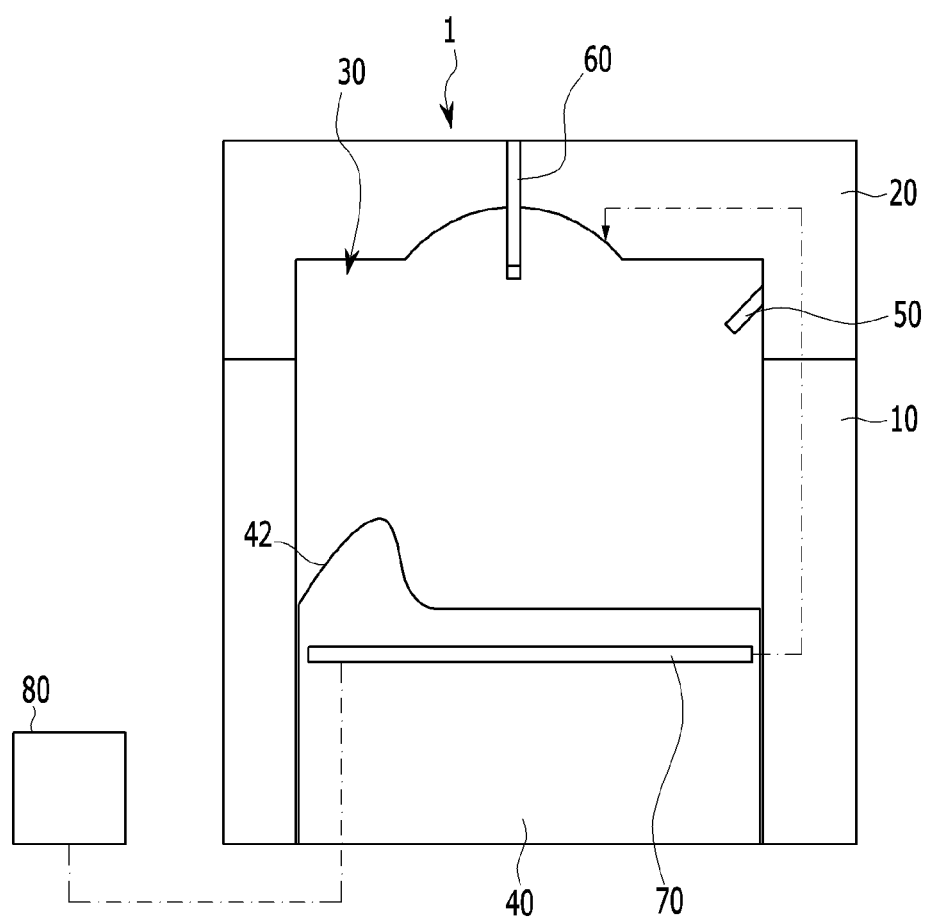
FIG. 1 illustrates a schematic diagram of a vehicle engine according to an exemplary embodiment of the present disclosure.

An exemplary embodiment of the present disclosure will hereinafter be described in detail with reference to the accompanying drawings.

Since the exemplary embodiments described in the specification and the configurations shown in the drawings are merely some exemplary embodiments and configurations of the present disclosure, they do not represent all of the technical ideas of the present disclosure, and it should be understood that that various equivalents and modified examples, which may replace the exemplary embodiments, are possible when filing the present application.

In order to clearly describe the present disclosure, parts that are irrelevant to the description are omitted and identical or similar constituent elements throughout the specification are denoted by the same reference numerals.

Since the size and thickness of each configuration shown in the drawings are shown for convenience of description, the present disclosure is not necessarily limited to configurations illustrated in the drawings, and in order to clearly illustrate several parts and areas, differing thicknesses may be shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

FIG. 1 illustrates a schematic diagram of a vehicle engine according to an exemplary embodiment of the present disclosure.

Referring to FIG. 1, a vehicle engine 1 according to an exemplary embodiment of the present disclosure may use a gasoline direct injection method which directly injects a fuel into a combustion chamber 30.

The engine 1 generally may include a cylinder block 10, a cylinder head 20, a piston 40, an injector 50 and a spark plug 60.

A plurality of cylinders may be provided inside the cylinder block 10. The cylinder head 20 may be disposed on an upper portion of the cylinder block 10, and may be provided with the combustion chamber 30 therein corresponding to the cylinder.

The piston 40 may be installed at the cylinder block 10 to be able to reciprocate in the cylinder block 10 so that the volume of the combustion chamber 30 may be compressed or expanded.

The injector 50 may be installed at the cylinder head 20 of the upper portion of the combustion chamber 30, and may inject a charged fuel into the combustion chamber 30.

In this case, a bowl 42 may be formed on a top surface of the piston 40 to protrude so that a fuel injected from the injector 50 swirl-flows.

That is, the fuel injected from the injector 50 may swirl-flow from a lower portion of the combustion chamber 30 to an upper portion thereof by the bowl 42, such that a vortex is generated in the injected fuel.

That is, the injected fuel may be smoothly mixed and reacted with air flowing into the combustion chamber 30 by the cyclone principle in which a centrifugal force is generated by its rotating flow in one direction toward an inner center of the combustion chamber 30.

The spark plug 60 may be installed at the cylinder head 20 at a center of the upper portion of the combustion chamber 30, and the fuel injected from the injector 50 may be ignited by the spark plug 60 when the compression stroke is performed by the piston 40.

In this case, the engine 1 according to an exemplary embodiment of the present disclosure may further include a voltage generating member 70 that is installed inside the piston 40 to generate a voltage by pressure generated during the compression stroke of the piston 40.

The voltage generating member 70 may generate repulsive force between the charged fuel particles injected from the injector 50, and may form an electric field by a potential difference in the combustion chamber 30 when a voltage is generated for the charged fuel particles to flow in the stratified mode, a position of which is close to the spark plug 60.

The voltage generating member may be made of a piezoelectric material which has a piezoelectric effect.

The piezoelectric material is one that generates a voltage when a mechanical pressure (an external force) is applied thereto and that generates a mechanical modification when a voltage is applied thereto. The piezoelectric material is a publicly known technology that is widely known to those skilled in the art, thus a detailed description thereof may be omitted.

The voltage generating member 70 may transmit a positive voltage to an upper inner surface of the combustion chamber 30 disposed at the cylinder head 20, and may transmit a negative voltage to an inner wall of the combustion chamber 30 and an upper surface of the piston 40.

Thus, the voltage generating member 70 may form an electric field in the combustion chamber 30.

The electric field formed in the combustion chamber 30 together with the swirl-flow caused by the bowl 42 may move the charged fuel particles injected from the injector 50 to an upper portion thereof which may have the positive polarity to lead to the stratified mode. Moreover, the electric field may generate repulsive force among the fuel particles to prevent the respective fuel particles from being adsorbed to each other and from being adsorbed to the combustion chamber 30 and the piston 40.

Thus, the charged fuel particles may be smoothly mixed and reacted with the air flowing into the combustion chamber 30 by the cyclone principle in which a centrifugal force is generated by its rotating flow in one direction toward the inner center of the combustion chamber 30, and the charged fuel particles may thus be moved to the upper portion of the combustion chamber 30 at which the spark plug 60 is disposed to form the stratified mode.

Alternatively, in a present exemplary embodiment, the voltage generating member 70 may be electrically connected to an external power supply 80 provided at the outside of the cylinder block 10.

When the vehicle is off and/or when the ignition is on, the external power supply 80 may apply a constant voltage to the voltage generating member 70 to excite and vibrate an ultrasonic wave generated from the voltage generating member 70.

That is, when the constant voltage is applied to the voltage generating member 70, the ultrasonic wave generated by the modification or the stress of the voltage generating member 70 may be excited and vibrated. As such, the ultrasonic wave generated from the voltage generating member 70 may remove the carbon stacks formed on the combustion chamber 30, the piston 40 and the spark plug 60.

An operation and application of the vehicle engine 1 according to an exemplary embodiment of the present disclosure will now be described.

Figure 2:
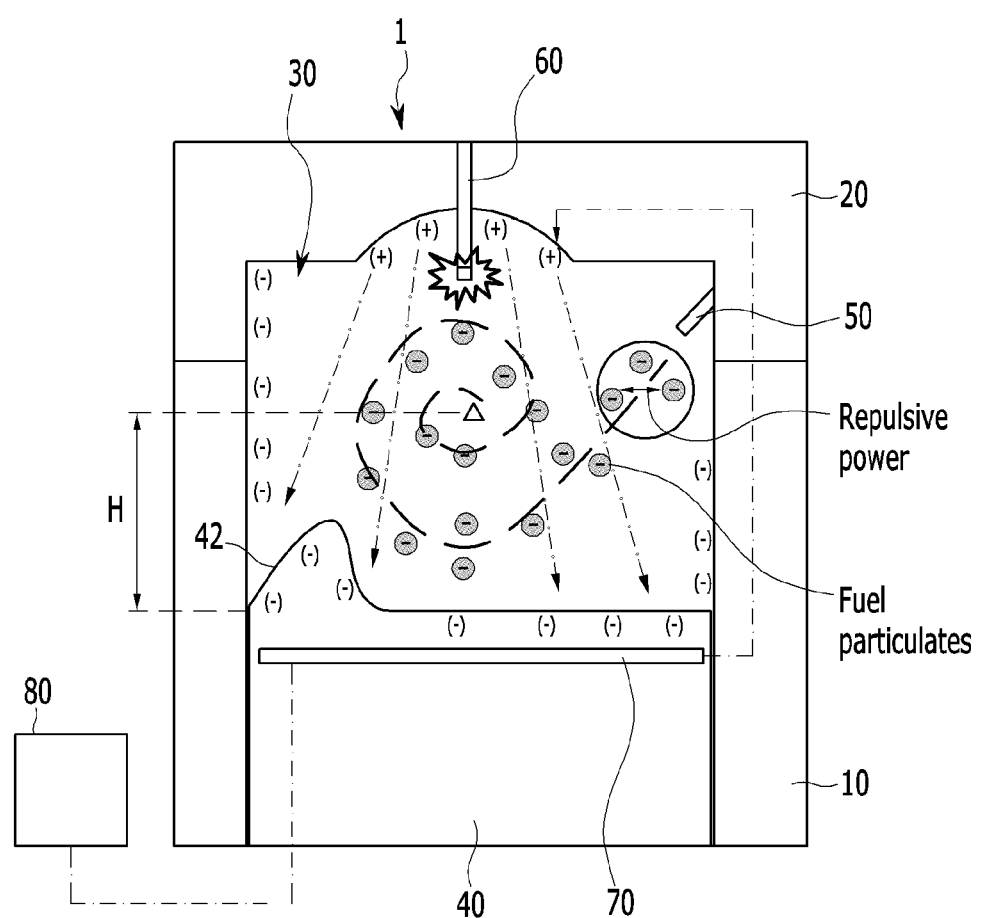
FIG. 2 illustrates an operation diagram of a vehicle engine according to an exemplary embodiment of the present disclosure.
Figure 3:
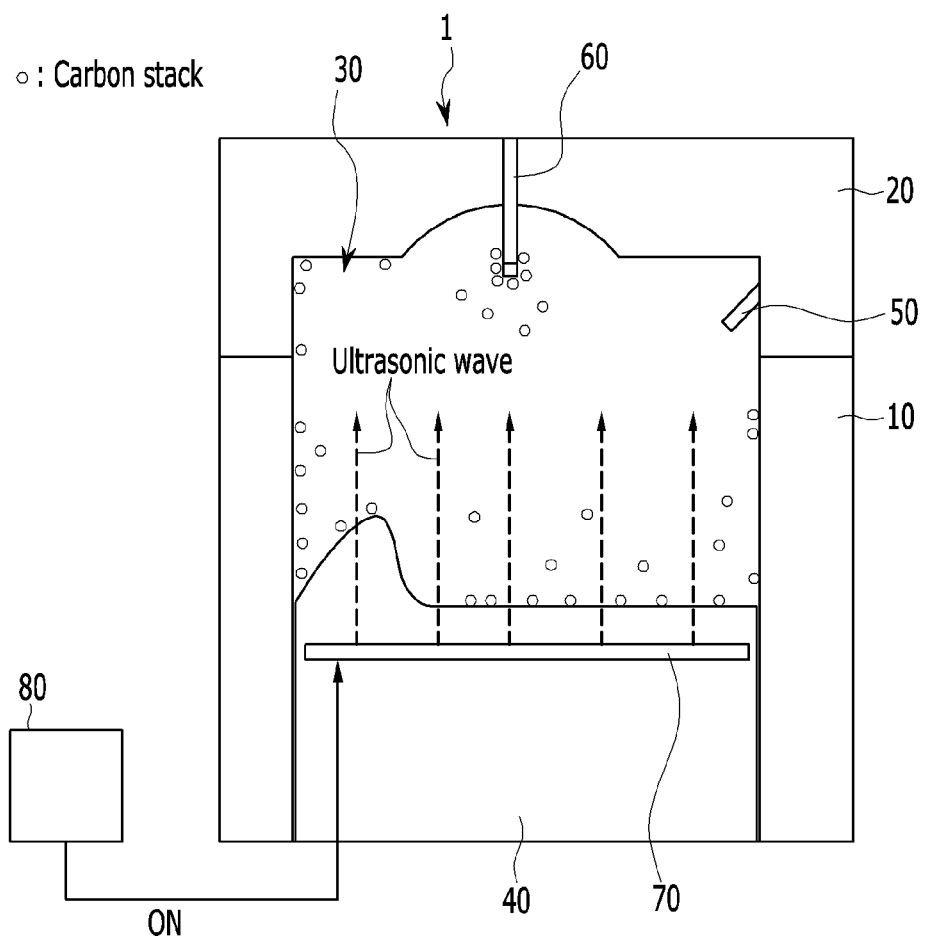
FIG. 3 illustrates a schematic diagram of an operation state for removing a carbon stack in a vehicle engine according to an exemplary embodiment of the present disclosure.

FIG. 2 illustrates an operation diagram of the vehicle engine according to an exemplary embodiment of the present disclosure, and FIG. 3 illustrates a schematic diagram of an operation state for removing a carbon stack in the vehicle engine according to an exemplary embodiment of the present disclosure.

Referring to FIG. 2, when the engine 1 operates, a fuel may be injected from the injector 50. The injected fuel may be swirl-flowed by the bowl 42 of the piston 40 from the lower portion of the combustion chamber 30 to the upper portion thereof.

In this case, the injected fuel may be smoothly mixed and reacted with the air flowing into the combustion chamber 30 by the cyclone principle in which a centrifugal force is generated by its rotating flow in one direction toward the inner center of the combustion chamber 30.

In such a state, when the compression stroke of the piston 40 is performed, a voltage may be generated from the voltage generating member 70 by the pressure generated by the piston 40.

Here, the voltage generating member 70 may transmit a positive voltage to the upper inner surface of the combustion chamber 30 disposed at the cylinder head 20, and transmit a negative voltage to the inner wall of the combustion chamber 30 and the upper surface of the piston 40.

Thus, a potential difference may be generated between the upper portion of the combustion chamber 30 and the top surface of the piston 40, thus an electric field may be formed depending on the potential difference. The electric field may cause the repulsive force among charged fuel particles.

Moreover, the electric field together with the swirl-flow by the bowl 42 may decrease the descending force caused by the weight of the charged fuel particles injected from the injector 50 and may raise them to the upper portion of the combustion chamber charged with the positive polarity, such that the fuel particles lead to a stratified mode.

Simultaneously, the electric field may generate the repulsive force among the fuel particles to prevent the respective fuel particles from being adsorbed to each other and from being adsorbed to the combustion chamber 30 and the piston 40.

Thus, the charged fuel particles may be smoothly mixed and reacted with the air flowing into the combustion chamber 30 by the cyclone principle in which a centrifugal force is generated by its rotating flow in one direction toward the inner center of the combustion chamber 30, and the charged fuel particles may be moved to the upper portion of the combustion chamber 30 at which the spark plug 60 is disposed to form the stratified mode.

Accordingly, adsorption of the fuel particles to each other may be minimized, the stratified mode may be formed by the swirl-flow and the electric field, and the fuel particles may be prevented from being adsorbed to the inner wall of the combustion chamber 30 and the top surface of the piston 40.

In such a state, the spark plug 60 may operate to ignite the fuel particles in the stratified mode, thus an explosion may occur in the combustion chamber 30.

In this case, since the fuel particles mixed with air may be in the stratified mode and may be close to the spark plug 60, they may be completely combusted in the combustion chamber.

Moreover, the vehicle engine 1 according to an exemplary embodiment of the present disclosure may minimize the adsorption of the fuel particles and perform the explosion stroke in a state in which the fuel particles are in the stratified mode, thereby preventing or minimizing the abnormal combustion.

On the other hand, as shown in FIG. 3, when the vehicle is off and/or the ignition is on, the external power supply 80 may apply a constant voltage to the voltage generating member 70.

When the constant voltage is applied to the voltage generating member 70, the ultrasonic wave generated by the modification or the stress of the voltage generating member 70 may be excited and vibrated.

The excited and vibrated ultrasonic wave generated from the voltage generating member 70 may be transmitted to the combustion chamber 30, the piston 40 and the spark plug 60. Thus, while the engine 1 operates, the carbon stacks formed on the combustion chamber 30, the piston 40 and the spark plug 60 may be efficiently removed, such that the engine 1 may be cleanly maintained.

In an exemplary embodiment of the present disclosure, the vehicle engine 1 to which the gasoline direct injection method is applied is exemplarily described, but the present disclosure is not limited thereto, and it may be applied to an engine in which mixture of fuel and air flows into the combustion chamber 30 thereof.

According to the vehicle engine 1 of an embodiment of the present disclosure, it may be possible to prevent the fuel particles from being adsorbed to the inside of the combustion chamber 30 and the piston 40, and may prevent the abnormal combustion, and thus may improve combustion efficiency by generating the electric field in the combustion chamber so that the fuel particles charged from the injector 50 are completely combusted in the stratified mode during the compression stroke in the vehicle to which the gasoline direct injection (GDI) method is applied.

Moreover, due to the complete combustion and the adsorption prevention of the fuel particles in the stratified mode cause, it may be possible to improve durability and fuel efficiency of the engine 1 by minimizing damage of the combustion chamber, the piston and the spark plug by minimizing occurrence of the carbon stack, and by preventing a starting delay and an additional fuel injection.

Furthermore, it may be possible to remove the carbon stacks formed on the combustion chamber 30, the piston 40 and the spark plug 60 and thus to cleanly maintain them by applying a predetermined voltage to the voltage generating member 70 provided in the combustion chamber 30 so that the ultrasonic wave may be generated while the starting is off and/or the ignition is on.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle engine comprising:
    a cylinder block;
    a cylinder head installed at an upper portion of the cylinder block and forming a combustion chamber therein;
    a piston installed at the cylinder block and reciprocating in the cylinder block so that the volume of the combustion chamber is compressed or expanded;
    an injector installed at the cylinder head for injecting fuel into the combustion chamber;
    a spark plug installed at the cylinder head for igniting the fuel injected from the injector; and
    a voltage generating member installed inside the piston so that a voltage is generated by a pressure generated during a compression stroke of the piston,
    wherein when the voltage is generated for charged fuel particles to flow in a stratified mode, a position of which is adjacent to the spark plug, the voltage generating member forms an electric field by applying a potential difference in the combustion chamber so that a repulsive force is generated among the charged fuel particles injected from the injector, and
    wherein the voltage generating member transmits a positive voltage to an upper inner surface of the combustion chamber provided at the cylinder head, and transmits a negative voltage to an inner wall of the combustion chamber and a top surface of the piston,
    wherein the voltage generating member is electrically connected to an external power supply provided at an outside of the cylinder block,
    wherein the external power supply, when a vehicle is off and/or an ignition is on, applies a predetermined voltage to the voltage generating member to excite and vibrate an ultrasonic wave generated from the voltage generating member, and
    wherein the ultrasonic wave generated from the voltage member removes a carbon stack formed on the combustion chamber, the piston and the spark plug.

2. The vehicle engine of claim 1, wherein the voltage generating member is made of a piezoelectric material.

3. The vehicle engine of claim 1, wherein a bowl is provided at the top surface of the piston and causes the fuel injected from the injector to swirl-flow.

* * * * *